United States Patent [19]

Allen et al.

[11] Patent Number: 4,536,770

[45] Date of Patent: Aug. 20, 1985

[54] REVERSE SIDE MARKING PLOTTER/PRINTER PAD

[75] Inventors: Richard M. Allen, Andover, Mass.; Jeffrey M. Arnold, Ridgewood, N.J.; Joseph J. Field, Hudson, N.H.; Terry E. Spraker, Middleton, Wis.

[73] Assignees: Allen Datagraph Incorporated; Datascope Corporation

[21] Appl. No.: 538,321

[22] Filed: Oct. 3, 1983

[51] Int. Cl.³ .................... G01D 9/00; G01D 15/34
[52] U.S. Cl. .................................. 346/29; 346/68; 346/134
[58] Field of Search ............... 346/29, 8, 45, 134, 346/104, 68

[56] References Cited

U.S. PATENT DOCUMENTS 2,937,912  5/1960  Cymmer ........................... 346/8
3,589,327  6/1971  Jacobs ............................. 346/8
4,291,313  9/1981  Dold ............................... 346/68

Primary Examiner—E. A. Goldberg
Assistant Examiner—Mark Reinhart
Attorney, Agent, or Firm—Cesari and McKenna

[57] ABSTRACT

Improved plotting and printing apparatus has a writing surface for supporting a printing medium and which has an opening for exposing the underside of the medium. A transparent plate is mounted to the supporting surface so as to permit placement onto that surface of a printing medium such as a plural leaf form set whose area is larger than that of the plate so that one portion of the medium extends across the opening under the plate and can be printed on by a printer positioned under the surface opposite the opening, while another portion of the medium lies on the surface beyond the plate so that it can be written on from above the surface.

17 Claims, 3 Drawing Figures

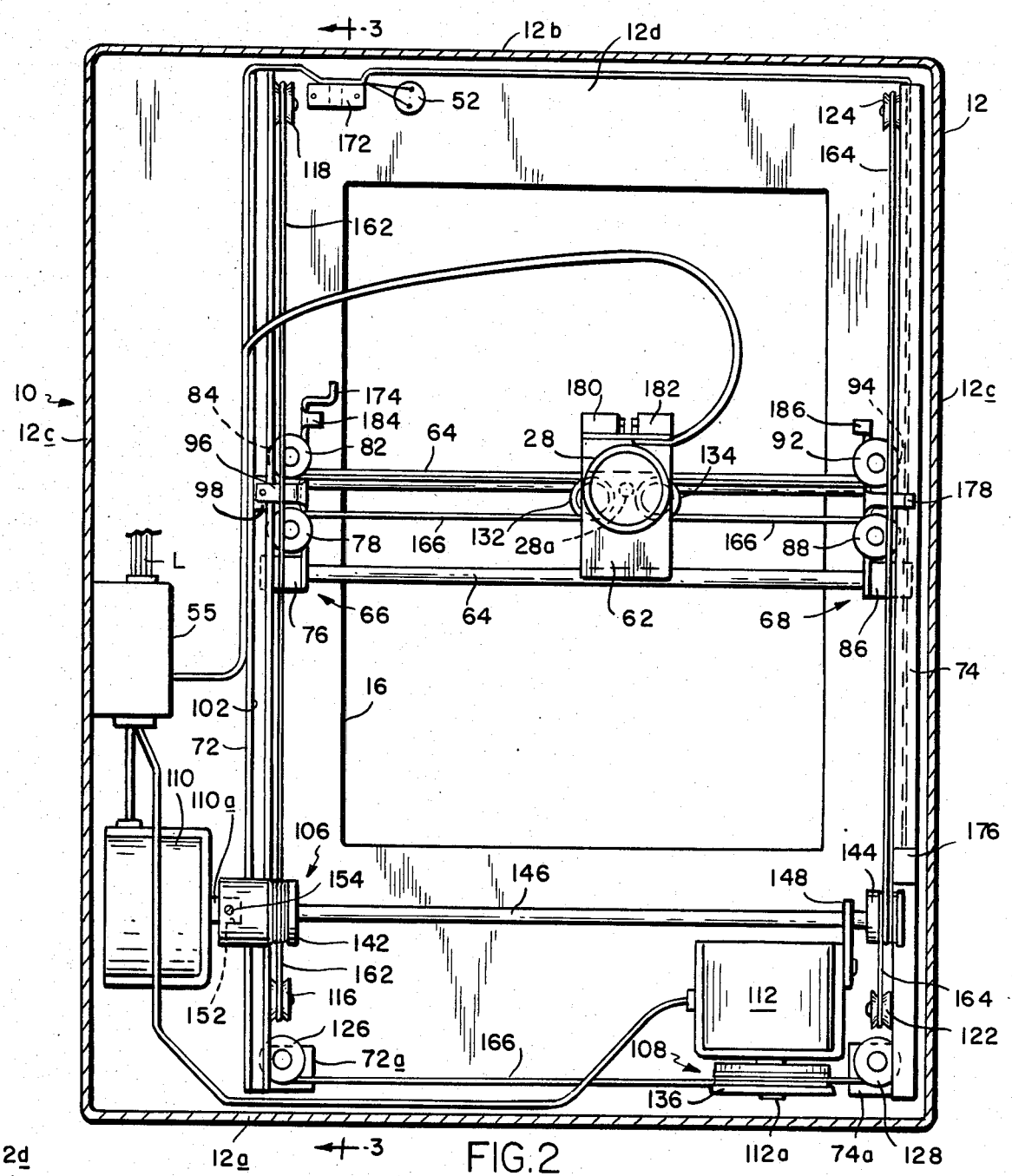
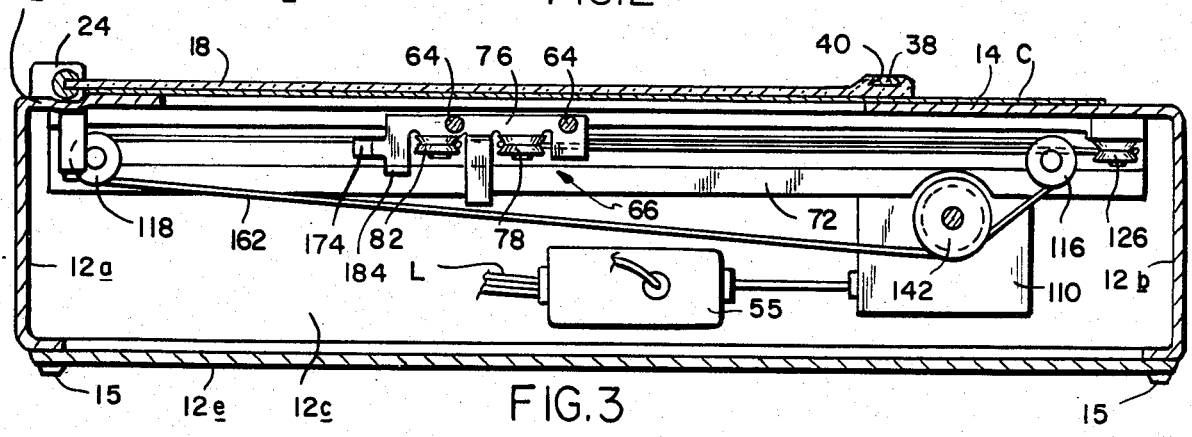

REVERSE SIDE MARKING PLOTTER/PRINTER PAD

This invention relates to plotting and printing apparatus for recording and displaying data. It relates more particularly to a small lightweight plotter/printer pad or tablet which can easily be held in the hand or supported on one's lap.

BACKGROUND OF THE INVENTION

The apparatus to be described herein has general application as the plotter/printer component of a fixed data terminal or as an interface with a computer. It may be used in many business and industrial applications such as data acquisition or logging, inventory taking, stock picking, navigation, etc. For example, during an operation, an anesthesiologist is usually responsible for administering the drugs and for controlling various machines required to sustain the patient during the course of the operation. It is especially useful for recording medical and clinical data. The decisions which he makes are based to a great extent upon his observations of various patient functions which are monitored during the operation. These functions might include, for example, the patient's temperature, blood pressure, heart rate, blood gas concentration, etc. This information is acquired by various data-gathering devices connected to the patient and displayed by various recording machines.

Prior recorders of this type have not been entirely satisfactory, particularly for office, medical and clinical usage, for several reasons. They have tended to be rather large and heavy so that they cannot be moved about readily. Some recorders of the type which print data by impaction are quite noisy so that they are not suitable for use in an operating room or office environment. Some machines provide only an obstructed view of the data being recorded so that it is difficult for the operator to see the data and to make contemporaneous notes based thereon. Many of the present machines record data on paper tapes or scrolls and it is difficult for the user to write on those loose tapes. Ideally, the printer or plotter used by the physician or other operator should permit him to clearly see the information being recorded as it is being recorded and to make contemporaneous notes on the same record.

Finally, the prior plotters and printers only generate a single original record of the acquired data. For example, if copies of the record made during an operation are needed after the operation for placement in the hospital file, the surgeon's and anesthesiologist's files, or for other distribution, they are made at that time. It has been found, however, that after the operation, sometimes the only original record is changed, copies are made and then the original record is "lost" so that the only available records are incorrect or inconsistent copies. It would be highly desirable, then, especially for medical and clinical applications, that the recorder produce two or more original records of the data being recorded.

THE PRIOR ART

Various types of plotting tables have been available for many years. One type, the dead reckoning trace (DRT) plotter used on naval vessels includes a glass topped table on which a semitransparent chart is positioned. The chart is illuminated by a diffuse light source located below the plate and there is an XY plotting mechanism positioned under the plate. The mechanism includes a carriage which carries a point source of light aimed at the underside of the chart thereby producing a light spot on the chart. The plotting mechanism receives ship's course and speed information so that the movement of the carriage and the light spot reflects the ship's movements. In this way, the operator can plot the ship's position on the chart by periodically marking the location of the light spot on the chart. Also, he can mark on the chart the locations of other ships or objects relative to the position of his ship.

A more sophisticated version of that basic plotter is disclosed in U.S. Pat. No. 3,072,908. That reference shows a plotter in which a strip of semitransparent paper is scrolled in the Y direction under a transparent plate and a carriage located under the strip is movable in the X direction. The carriage carries a device for marking the underside of the strip. Thus, when these two movements are controlled in accordance with the ship's course and speed, the track of the ship on the paper can be seen from above the table. In that plotter, the carriage also supports a gantry terminated by a second marking device. The movements of the gantry are controlled by the outputs of various radars which track other ships in the vicinity so that the plotter also records the positions of those ships with respect to the plotting ship.

Those DRT plotting tables are quite large, being on the order of four feet on a side. Obviously, then, they would be quite impractical for use in an office or operating room. Moreover, even a scaled-down version of such a plotting table would be undesirable for the applications of interest here because it would not permit the entry of plotted data and of the operator's notes on the same physical record.

U.S. Pat. No. 2,937,912 shows a somewhat similar type of plotter having a sheet of transparent waxed paper or cloth adhered to the underside of a glass plate and impacted from below by a printhead to transfer wax from the paper or cloth to the glass plate. These wax markings are visible from above the plotter when sidelighted. Also, it is stated in that reference that other marks can be made on the upper surface of the glass plate so that both those marks and the marks on the underside of the plate will be visible. Clearly, the glass plate in a miniaturized version of such a plotter could not be used to provide a permanent record because the plate is too bulky and fragile and the markings thereon are not permanent. While the wax paper or cloth might constitute a semipermanent record of the plotted data, that sheet material could not also carry any user notes because that material is fully enclosed within the plotter.

Finally, U.S. Pat. No. 3,589,327 discloses a hand-held aircraft plotting pad with a space to permit the user to make notes from above. A compartment with a transparent wall is provided at the left-hand edge of the pad in which moves a pointer at a rate corresponding to the plane's air speed. A map or chart is positioned under the surface of the plotting pad with the desired course track located parallel to the left-hand edge of the pad so that the pointer moves along the track, thereby indicating the present position of the aircraft. While this pad is small enough to be used in an office or an operating room environment, it does not make marks on paper, but simply provides a pointer which moves along a preselected track on a sheet of paper.

Finally, it should be mentioned that none of the prior plotter/printers of which we are aware, including those identified above, provide two or more hard copy originals of the plotted data and personal notes relating to the plotted data made by the individual using the plotter.

OBJECTS OF THE INVENTION

Accordingly, it is an object of the present invention to provide a plotter/printer pad for producing a permanent record of alphanumeric characters, trend lines or other graphics originating from data-gathering apparatus.

Another object of the invention is to provide a plotter or printer which is relatively small and lightweight and which can be used readily by a physician, clinician or other person.

Another object is to provide a plotter/printer of this type which is quiet enough to be used in an office or operating room environment.

A further object of the invention is to provide a compact hand-held plotting/printing pad which provides a permanent record of both acquired data and contemporaneous notes made by the operator relating to that data.

Still another object of the invention is to provide a plotter/printer which can produce two or more permanent original records of the recorded information.

Another object of the invention is to provide a plotter/printer which plots or prints data on a record, while enabling the user to see that data readily as it is being recorded and to enter comments about the data on the same record.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

SUMMARY OF THE INVENTION

Briefly, the present plotter/printer pad or tablet can be used to plot and record data acquired by data-gathering apparatus or to interface with a computer. As noted above, it is especially useful for plotting patient data and displaying that data so that a physician or clinician can clearly see it and, if he wishes, inscribe his own personal comments on the same record containing the acquired data.

The pad comprises a flat writing surface having an opening in one section covered by a movable transparent plate. The plate is mounted to the surface to permit the placement on that surface of a recording medium, namely, a sheet of paper, or more preferably, a multileaf paper or form set. The area of the set is larger than that of the opening so that, when the plate is fixed in position over the opening, one portion of the set extends across the opening underneath the plate and is thus accessible from below the writing surface and another portion of the set extends beyond the plate edges so that that portion is accessible from above the pad.

A printing or plotting mechanism having one or more print heads is positioned under the writing surface opposite the opening so that the head projects up into the opening and is in position to engage the underside of the form set. The print head can be a thermographic or impact head. Most preferably, however, to minimize noise, the head is a so-called force-actuated head as will be described later. Of course, the form set is selected so that it can be printed on by the particular print head being used. The transparent plate holds the paper set tightly against the writing surface and fixes the position of the set. Also, the plate functions as a back-up surface or anvil for the print head.

During operation of the plotter/printer pad, the print head is positioned in response to electrical signals applied to the unit from the data-gathering equipment to which it is connected. These incoming signals also actuate the print head so that it writes from below on the area of the form set exposed in the opening. The printing may be alphanumeric characters, waveforms, trend lines, graphs, etc. and the same data is recorded on all sheets of the form set, including the uppermost sheet directly below the transparent plate. Thus, all of the data being plotted or printed is readily visible to the physician or other user of the pad as that data is being recorded.

The portions of the form set beyond the edges of the transparent plate can be used by the operator to inscribe his personal comments relating to the data being recorded and, if desired, he can associate his notes with points of interest in the plotted data. All of that information being recorded manually from above appears on all of the sheets of the form set and thus constitutes part of the permanent record. Thus, the apparatus provides two or more duplicate originals of the plotted data and any contemporaneous notes made by the user of the apparatus. If the data relates to an operation, for example, these duplicate records are available immediately after the operation for distribution. This minimizes the chances of the record being changed after the fact.

The present apparatus is compact and lightweight (e.g. 2.5 lbs.) and can easily be held in the hand or supported on one's lap. Therefore, it does not materially reduce the mobility of the user as he performs other duties. Moreover, because the recorded data is clearly displayed by the apparatus, the user can respond quickly to it. Consequently, the pad should find wide application in industrial plants, offices, operating rooms, and clincics and indeed wherever it is desirable to provide two or more hardcopy records of acquired data whether or not accompanied by contemporaneous notes.

BRIEF DESCRIPTION OF THE DRAWINGS

For a fuller understanding of the nature and objects of the invention, reference should be had to the following detailed description, taken in connection with the accompanying drawings, in which:

FIG. 2 is a bottom plan view of the pad showing its internal components in greater detail; and FIG. 3 is a sectional view along line 3—3 of FIG. 2.

DESCRIPTION OF THE PREFERRED EMBODIMENT

Figure 1:
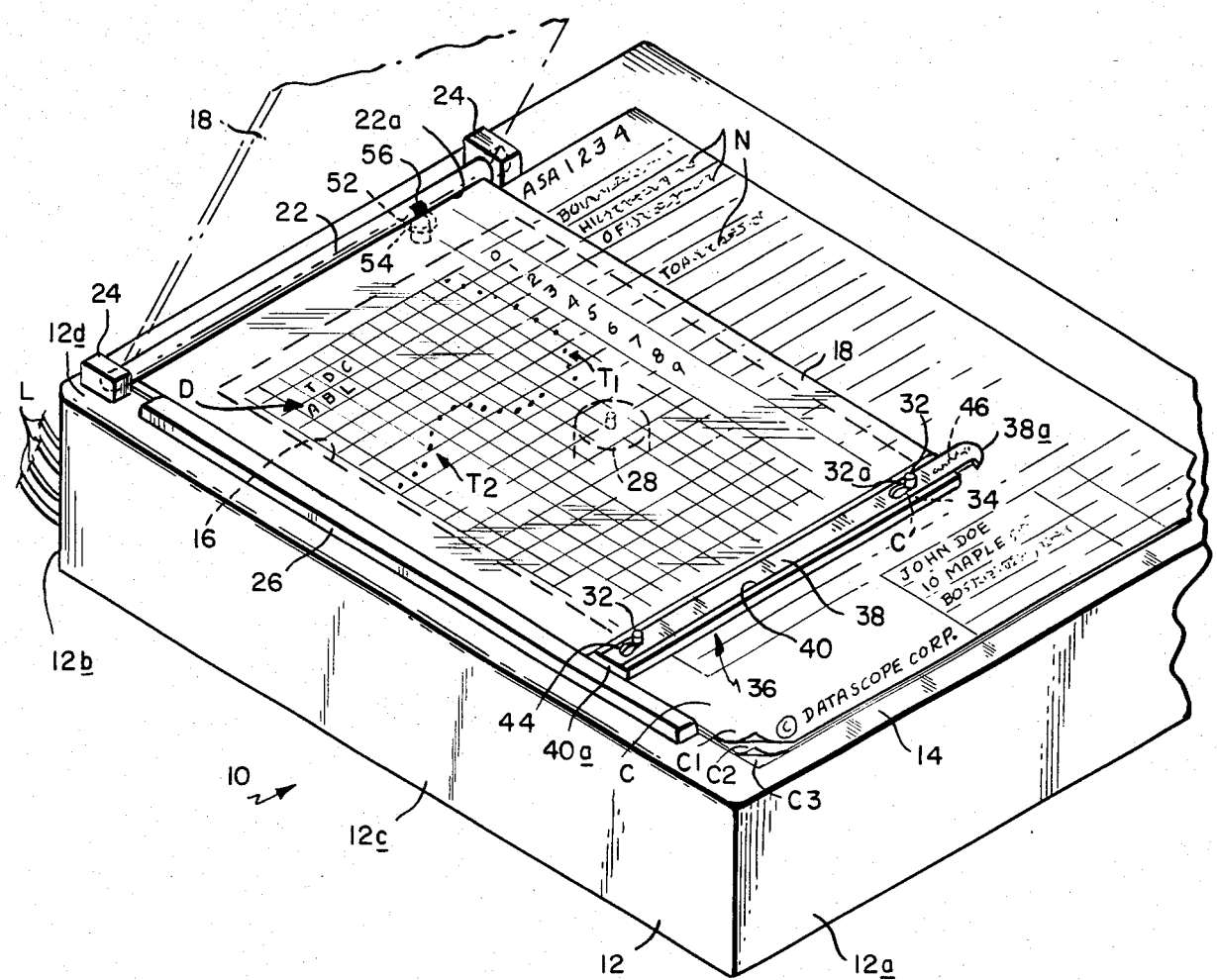
FIG. 1 is an isometric view with parts broken away showing a plotter/printer pad embodying the features of this invention.

Referring now to FIG. 1 of the drawings, the subject plotter/printer pad indicated generally at 10 comprises a generally rectangular housing 12 made of a suitable strong lightweight material. The housing includes a front wall 12a, a rear wall 12b and a pair of side walls 12c. The housing top wall 12d, which is flat, functions as a writing surface 14. The underside of housing 12 may be closed by a panel 12e (FIG. 3) which is removably secured to the housing side walls by suitable fasteners 15.

The housing top wall 12d constituting the writing surface 14 is formed with a relatively large rectangular opening 16 at its upper left-hand corner. This leaves relatively large writing surface 14 areas to the right of and below opening 16.

A rigid transparent glass or plastic plate 18 is mounted to housing 12 so that it removably covers the opening 16 therein. In the illustrated unit, the upper edge of plate 18 is hinged to the housing top wall 12d so that the plate can be swung between an open position illustrated by dotted lines in FIG. 1 wherein it is oriented more or less perpendicular to surface 14 and a closed position shown in solid lines in that same figure in which the plate lies flush against surface 14. The plate has the same shape as opening 16 and its dimensions are slightly larger than those of the opening so that, when the door is in its closed position, it overlies the edge margins of opening 16. To achieve the hinged connection, the upper edge of plate 18 is received in a slot 22a of a rod 22, the opposite ends of which are journaled in a pair of ears 24 projecting up from the housing top wall 12d between opening 16 and the housing rear wall 12b.

When the plate 18 is in its open, dotted-line position, a printing medium C such as a sheet or sheets of paper can be positioned as shown on writing surface 14. A rib 26 is provided to the left of opening 16 against which the left-hand edge of the medium may be abutted to help position the medium properly on surface 14. As clearly seen in FIG. 1, the medium C has more or less the same area as writing surface 14 so that a portion of the medium lies under plate 18 and extends across opening 16. Therefore, it can be printed on from below by a print head 28 located inside housing 12 opposite the opening.

The print head constitutes part of a plotting/printing mechanism to be described in detail later. Suffice it to say at this point that the mechanism plots and prints data acquired by datagathering apparatus. The output signals from those various machines are coupled to pad 10 by appropriate electrical leads L terminated by connectors which plug into mating connectors (not shown) in the rear wall of housing 12. Those signals may represent medical data such as temperature, pressure, blood gas concentration or non medical information such as product inventory, traffic flow, etc. That acquired data is printed out by head 28 on medium C in the form of alphanumeric characters D or vertical or horizontal waveforms or traces such as T1 and T2. The printing medium C is selected so that the data appears on the upper surface of the medium and is thus immediately clearly visible to the observer through the transparent plate 18.

The exposed portions of medium C extending to the right of and below door 18 lie flush against the flat writing surface 14 and are thus available to the user of the pad for entering general comments or personal notes N relating to the data being plotted on the medium by print head 28. Pad 10 is quite small and lightweight so that the user can hold the plotter in his hand or support it on his lap which will allow him to clearly see the data D, T1, T2 being printed on medium C and to make his personal notes N, at the same time he is moving about or controlling other equipment.

The size of medium C depends upon the size of the plotter and the medium format (i.e., its lines and labels) depends upon the particular application. The illustrated medium is a standard 8½×11 inch or DIN A-4 size and the plotter plate 18 is about 8½ inches long and 6 inches wide so that the two exposed marginal areas of the medium available for notes N are each about 2½ inches wide.

Medium C may constitute a single sheet or sheets of paper. More preferably, however, it constitutes a multi-sheet set. Thus, the specific printing medium C depicted in FIG. 1 is a set of three sheets or plies C1, C2 and C3, each one having the same format. The form set can be written on from below by print head 28 and written on from above by the pad user, with all of the printings and writings being impressed on all of the sheets C1, C2 and C3. In this way, three duplicate originals of the acquired data and the user's notes are immediately available. If the pad 10 is used during an operation, for example, upon completion of the operation, duplicate original records may immediately be placed in the hospital file for that patient, as well as in the surgeon's and anesthesiologist's files. Consequently, following the operation no question can be raised as to the accuracy of the record of that operation.

The type of paper comprising medium C depends upon the type of print head 28 used in the plotter. The illustrated print head 28 is a force-actuated printer whose print stylus or striker has a total stroke which is more or less equal to the thickness of medium C so that the medium is crushed, rather than impacted, at the point of contact by the stylus. Therefore, medium C comprises paper suitable for such force-actuated printing.

The pad 10 has actually printed successfully on coated paper such as the type having a white wax or plastic layer over a dark substrate so that, when the paper is impacted, the dark substrate becomes visible at the point of impact. The pad has also been used successfully with chemically treated paper such as so-called NCR paper manufactured by NCR Corporation. Of course, when a multi-sheet set of this type of paper is utilized, the top sheet or layer C1 must be of the so-called self-contained type so that when data is printed on the paper set from below, the data appears on the upper surface of the top sheet C1.

The force-actuated print head 28 specifically illustrated herein is a biased solenoid with a single print wire or stylus. The stylus is kept in contact with the underside of medium C by a light spring or a low level bias current through the solenoid winding. To make an impression, a higher level current pulse is applied to the winding which increases the force on the stylus so that the stylus advances against the medium causing a dot to appear on all sheets of the medium C. The action of the stylus is essentially one of crushing the medium rather than smashing or impacting against it. Consequently, relatively high quality printing is obtained with minimum noise.

Print head 28 is moved vertically and horizontally relative to medium C and actuated between those movements so that it can print lines, symbols, graphics and characters in virtually any language. Typically the characters are formed using a 5×7 dot matrix at a rate of 50 to 200 dots/sec, there being a trade-off between printing speed, printing force, print quality and noise depending upon the particular application and operating environment.

Various modifications to the head are, of course, possible. For example, the stylus can be actuated ultrasonically and/or heated and/or spun on its axis if even better quality printing or quieter operation is desired. If faster printing is a requirement, a more or less conventional multi-stylus head may be used. Also, in some aplications, an entirely different type of printer may be incorporated into the pad such as one which prints with a type ball or daisy wheel. Of course, if the print head 28 is of the variety which prints thermographically, the medium C would be composed of thermographic or heat sensitive paper.

Referring to FIGS. 2 and 3, it is essential that the chart be positioned correctly on the writing surface 14 and that the plate 18 be held tightly against chart C at all four corners so that it constitutes a rigid platen or anvil for the impact print head 28. If these conditions are met, the pad 10 will assuredly print the acquired data at the proper places on medium C and that data will be clearly visible on all of the medium sheets, particularly the top sheet C1. Accordingly, pad 10 includes a pair of locating pins 32 which project up from the housing top wall 12d just below the lower edge of opening 16 therein. When the plate 18 is in its closed position, these pins project through registering holes 34 in the lower two corners of that plate. Also, the medium C has locating holes C' which receive the pins 32 when the chart is properly located on the writing surface 14.

The plate 18 is locked in its closed position by a latching mechanism shown generally at 36 in FIG. 1 which secures the two free corners of the plate to the housing top wall 12d. The latching mechanism 36 comprises a strap 38 slidably retained in a dovetail slot 40 formed adjacent the lower edge of plate 18 opposite the holes 34 therein. Strap 38 has keyholes 44 located more or less opposite the plate holes 36. The strap can be slid to the right by grasping its exposed end 38a which functions as a handle until the larger ends of the keyholes are aligned with plate holes 34. Now, using the handle 38a the plate can be swung to its closed position against surface 14 with pins 32 projecting through holes 34 into the keyholes. If the strap is now slid to the left, the narrow ends of the keyholes engage in reduced-diameter necks 32a formed in pins 32 thereby locking the plate in its closed position as shown in FIG. 1. A coil spring 46 acting between the edge of plate 18 and strap handle 38a biases the strap toward the left to its locked position which is established by an abutment 40a at the left-hand end of slot 40. Plate 18 is unlatched and opened by pulling strap handle 38a to the right and lifting up on that handle.

Still referring to FIG. 1, in the preferred embodiment of pad 10, means are provided for detecting when printing medium C is present on the writing surface 14 and when the plate 18 is latched closed so that the pad can be controlled to operate only when these two conditions exist. Various known means may be used for these purposes. In the illustrated pad 10, the presence of medium C on surface 14 is sensed by a detector 52 mounted in a small opening 54 in the housing top wall 12d under the plate hinge rod 22. When the medium is present, light produced by detector 52 is reflected from the light-colored underside of the medium back to a photosensor in the detector causing the detector 52 to provide an enabling output to a control section 55 (FIGS. 2 and 3) in housing 12. When medium C is not present, light from detector 52 shines on a light absorbing area 56 of hinge rod 22 and is not reflected to the photosensor so that the detector issues no enabling signal to control section 55.

The proper closing and latching of plate 18 is sensed conveniently by a conventional continuity detector (not shown) in control section 55 which detects electrical continuity from one locating pin 32 to the other through strap 38. Enabling outputs from both the detector 52 and the continuity detector are required before pad 10 will function.

Referring now to FIGS. 2 and 3, the mechanism for moving the print head 28 so that the head can print or plot data on medium C constitutes a more or less standard XY plotting mechanism. The mechanism moves the head laterally along an X axis and longitudinally along a Y axis within the confines of opening 16 in response to coded signals from data acquisition apparatus. These signals are received over electrical leads L and routed to control section 55.

The plotting mechanism includes a carriage 62 which supports print head 28. The carriage is slidably mounted to a pair of spaced, parallel, laterally extending tracks in the form of rods 64. The opposite ends of those rods are connected to a pair of trunnions, shown generally at 66 and 68, which roll along a pair of spaced-apart longitudinal rails 72 and 74 mounted to the underside of housing top wall 12d outboard of the side edges of opening 16. Thus, the rods 64 and the supported carriage 62 can be moved longitudinally within opening 16 and the carriage 62 can be moved on rods 64 from side to side within that opening.

Trunnion 66 comprises a bracket 76 connected to the corresponding ends of rods 64. Also rotatively mounted to bracket 76 are a pair of pulleys 78 and 82 which engage in and roll along a slot 84 formed in the inboard side of rail 72. Trunnion 68 likewise comprises a bracket 86 which connects to the adjacent ends of rods 64. A similar pair of pulleys 88 and 92 are rotatively mounted to bracket 86 and roll along a slot 94 in the inboard side of rail 74. To minimize lateral play of the rods and trunnions with respect to rails 72 and 74, carriage 76 is formed with a lateral tab 96 which extends under rail 72 and supports a slider 98 which slides along a slot 102 formed in the underside of rail 72.

Carriage 62 is moved up and down and back and forth opposite opening 16 by a system of pulleys connected by lengths of string to windlasses indicated generally at 106 and 108 driven by stepping motors 110 and 112. Pulses applied to motor 110 from control section 55 cause the carriage 62 and the print head which it supports to move longitudinally (Y axis) in increments, while similar pulses from section 55 applied to motor 112 result in incremental lateral (X axis) movement of carriage 62 and the print head. By appropriately controlling both motors simultaneously, the print head can be caused to move obliquely or diagonally within opening 16.

To achieve this movement, a pair of pulleys 116 and 118 are rotatively mounted to the inboard side of rail 72 adjacent the opposite ends of that rail. A similar pair of pulleys 122 and 124 are mounted to rail 74 at corresponding locations thereon. Another pulley 126 is rotatively mounted to a tab 72a extending laterally from rail 72 just beyond pulley 116. A similar pulley 128 is rotatively mounted to a tab 74a extending from rail 74 directly opposite tab 72a. Finally, a pair of pulleys 132 and 134 are rotatively mounted to carriage 62 at laterally spaced-apart locations thereon. These two pulleys, as well as pulleys 78, 82, 88, 92, 126 and 128 all lie more or less in the same plane.

The windlass 108 comprises a single relatively large diameter pulley 136 mounted to the shaft 112a of motor 112 and aligned to take on string from, and let off string to, pulleys 126 and 128. Windlass 106, on the other hand, comprises a pair of pulleys 142 and 144 mounted to the opposite ends of a laterally extending rod 146 axially aligned with the shaft 110a of motor 110. The pulleys 142 and 144 are positioned so that the former is in line with pulleys 116 and 118, while the latter is aligned with pulleys 122 and 124, at the opposite sides of housing 12. The end of rod 146 adjacent pulley 144 is rotatively supported by a bracket 148 anchored to motor 112. The opposite end of the rod is rotatively coupled to motor shaft 110a in that the shaft extends into an axial opening 152 in pulley 142 and is retained there by a set screw 154.

The XY motion of the carriage 62 is accomplished by moving three strings 162, 164 and 166 wound around the various pulleys. The first two strings move the carriage 62 longitudinally, while the third string 166 moves it laterally. More particularly, one end of string 162 is anchored to pulley 142. After being wound a few times around that pulley, that string is trained up and around pulley 118, passed outboard of trunnion 66 and turned down around pulley 116. The free end of that string, after being tensioned and wound a few times around pulley 142, is anchored to that pulley. The stretch of string 162 passing outboard of trunnion 66 is anchored to the trunnion by suitable means such as a set screw or clamp (not shown).

String 164 follows the same route at the opposite side of the housing 12. That is, one end of string 164 is anchored to pulley 122. The string, after being wound around that pulley, is trained up and around pulley 124 and brought back past trunnion 68 where it is anchored to the trunnion. The string 164 then extends down and around pulley 122 and its free end segment is then wound about pulley 122 and anchored to that pulley. Thus, when stepping motor 110 is actuated, pulleys 142 and 144 are rotated in one direction or the other causing the trunnions 66 and 68 and carriage 62 to move, longitudinally opposite opening 16. Actually, since the paths of the strings 162 and 164 each lie more or less in a single plane, a toothed belt, could be used in lieu of the strings to obtain more positive longitudinal movement of the carriage.

The third string 166 has one end anchored to rail 72 adjacent pulley 118. That string then extends around pulley 82 on trunnion 66 and then around pulley 132 on carriage 62. String 166 then extends back around pulley 78 on trunnion 66 and then it is passed around pulley 126 and wound a few times about pulley 136 on motor 112. String 166 then follows a path around pulley 128 and thence around pulley 88 on trunnion 68 and also around pulley 134 on carriage 62. Finally, the free end segment of string 166 is engaged around pulley 92 on trunnion 68 and, after being tensioned, the bitter end is anchored to rail 74 adjacent its pulley 124. Thus, when the motor 112 is actuated to rotate pulley 136 in one direction or the other, the string 166 is pulled so as to move carriage 62 laterally within opening 16.

Preferably, means are provided to establish references for the lontigudinal and lateral movements of head 28. In pad 10, this is accomplished by an electro-optical limit switch 172 mounted to the underside of housing top wall 12d adjacent detector 52. This switch is tripped by a finger 174 mounted to trunnion 66 when head 28 is at one extreme of its longitudinal movement, i.e. extreme upper end of opening 16. A similar switch 176 mounted adjacent pulley 144 is actuated by a finger 178 on trunnion 68 to detect when head 28 is at the opposite end of the opening. Additional switches 180 and 182 mounted to carriage 62 are actuated by fingers 184 and 186 projecting from brackets 76 and 86 respectively when head 28 is at the extremes of its lateral movement within opening 16. These switches reset counters in control section 55 to establish reference positions for head 28 along its X and Y motion axes.

The control section 55, in response to the input signals arriving on leads L, applies forward and/or reverse pulses to motors 110 and 112 and print pulses to head 28 to print the acquired data at the correct locations on medium C. The three trains of pulses are timed in such a way that the X and Y motion pulses to motors 110 and 112 occur between the print pulses to head 28 so that the marks inscribed on medium C are sharp and distinct. In the illustrated pad 10, the cycle time is 10 ms. Within this period an X and/or Y motion increment takes place followed by a print pulse to head 28. It is important to note in this connection that the drag of the print stylus 28a on medium C is quite small so that the motion of the head along the X and Y axes occurs quite smoothly and freely. Of course, during printing there is no X or Y motion. The specific XY plotter control circuitry in section 55 for appropriately controlling motors 110 and 112 and head 28 as described above is well known and need not be detailed here.

It will be seen from the foregoing, then, that pad 10 is quite compact and lightweight and permits a physician, clinician or other user to clearly see acquired data being printed by the pad on the associated chart or other medium in the pad, while allowing him to enter his own comments on the same medium if he chooses to do so. The pad prints clearly and quietly so that it can be used even in an office or operating room environment, and it can provide multiple duplicate originals of the recorded data thereby reducing the chances of the record being altered or lost.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. Plotting and printing apparatus comprising
   A. means defining a writing surface for supporting a printing medium,
   B. means defining an opening in said surface for exposing the underside of said medium,
   C. a transparent plate dimensioned to cover said opening, but to leave uncovered at least a portion of said surface,
   D. means for mounting said plate to said surface defining means so as to permit the placement on said surface of a printing medium whose area is larger than that of the plate so that a first portion of the medium extends across the opening underneath the plate and a second portion of the medium extends beyond the plate and is supported by said supporting surface portion so tnat it can be written on from above said surface, and E. printing means including a print head mounted to said surface defining means so that the print head is disposed opposite said opening and can print on the underside of the first medium portion exposed in said opening.

2. The apparatus defined in claim 1 wherein the mounting means include hinge means for permitting said plate to be swung between
   A. a medium-loading position wherein the plate is angled away from said surface thereby exposing said opening, and
   B. an operating position wherein the plate lies generally parallel to said surface and covers said opening.

3. The apparatus defined in claim 2 and further including means for releasably locking said plate in its operating position so that the plate is firmly anchored to the surface defining means and can function as a rigid platen for the print head.

4. The apparatus defined in claim 3 and further including
   A. means for producing an indication when the plate is in its operating position and is locked, and
   B. means for disabling the printing means in the absence of said indication.

5. The apparatus defined in claim 2 and further including
   A. one or more holes formed in said plate at locations therein relatively remote from the hinge means, and
   B. a corresponding number of locating pins projecting from said surface at locations thereon such that when the plate is in its operating position, the pins project through said holes.

6. The apparatus defined in claim 5 and further including latch means movably mounted to said plate for engaging said locating pins when the plate is in its operating position thereby locking said plate in that position.

7. The apparatus defined in claim 5 and further including a printing medium positioned on said surface and extending under said plate when the plate is in its said operating position.

8. The apparatus defined in claim 7 and further including holes formed in said medium which register with and receive said locating pins when the medium is positioned properly on said surface.

9. The apparatus defined in claim 8 wherein said medium comprises two or more superimposed sheets of paper.

10. The apparatus defined in claim 8 wherein said medium constitutes a plural-leaf form set.

11. The apparatus defined in claim 1 and further including:
    A. means for producing an indication when a medium is supported properly on said surface, and
    B. means for disabling said printing means in the absence of said indication.

12. The apparatus defined in claim 1 wherein said printing means comprise an XY plotting mechanism.

13. The apparatus defined in claim 12 wherein said print head is a force-actuated print head having a stylus which marks the medium by crushing it at the points of contact.

14. The apparatus defined in claim 13 wherein the print head comprises in addition to the stylus
    A. a solenoid winding which when energized urges the stylus toward a printing medium supported on the supporting surface,
    B. means for applying a bias current to the winding for maintaining the stylus in contact with the medium, and
    C. means for applying an actuating current to the winding which urges the stylus against the medium so as to crush the medium and thereby mark the medium at the points of contact.

15. Plotting and printing apparatus comprising
    A. means defining a surface for supporting a printing medium,
    B. means defining an opening in said surface for exposing the underside of said medium,
    C. a plate dimensioned to cover said opening,
    D. means for movably mounting said plate to said surface defining means in an operating position so as to permit the placement on said surface of a printing medium so that a first portion of the medium extends across the opening underneath the plate, and a selected portion of said medium extends across the selected uncovered area of said surface,
    E. printing means including a print head mounted to said surface defining means so that the print head is disposed opposite said opening and can print on the underside of the medium portion exposed in said opening,
    F. means for releasably locking said plate in its operating position so that the plate is firmly anchored to the surface defining means and can function as a rigid platen for the print head,
    G. means for producing an indication when the plate is in its operating position and is locked, and
    H. means for disabling the printing means in the absence of said indication.

16. The apparatus defined in claim 15 and further including:
    A. means for producing an indication when a medium is supported properly on said surface, and
    B. means for disabling said printing means in the absence of said indication.

17. Plotting and printing apparatus comprising
    A. means defining a surface for supporting a printing medium,
    B. means defining an opening in said surface for exposing the underside of said medium,
    C. a transparent plate dimensioned to cover said opening, but to leave uncovered a selected area of said surface,
    D. means for movably mounting said plate to said surface defining means in an operating position so as to permit the placement on said surface of a printing medium so that a portion of the medium extends across the opening underneath the plate, a selected portion of said medium extends across the selected uncovered area and is exposed for writing on, and
    E. XY plotting means including a print head mounted to said surface defining means so that the print head is disposed opposite said opening and can print along two axes on the underside of the medium portion exposed in said opening.

* * * * *